Feb. 6, 1945. E. J. RAY 2,368,878
AUTOMATIC SHOE MACHINE
Filed May 26, 1943 14 Sheets-Sheet 6
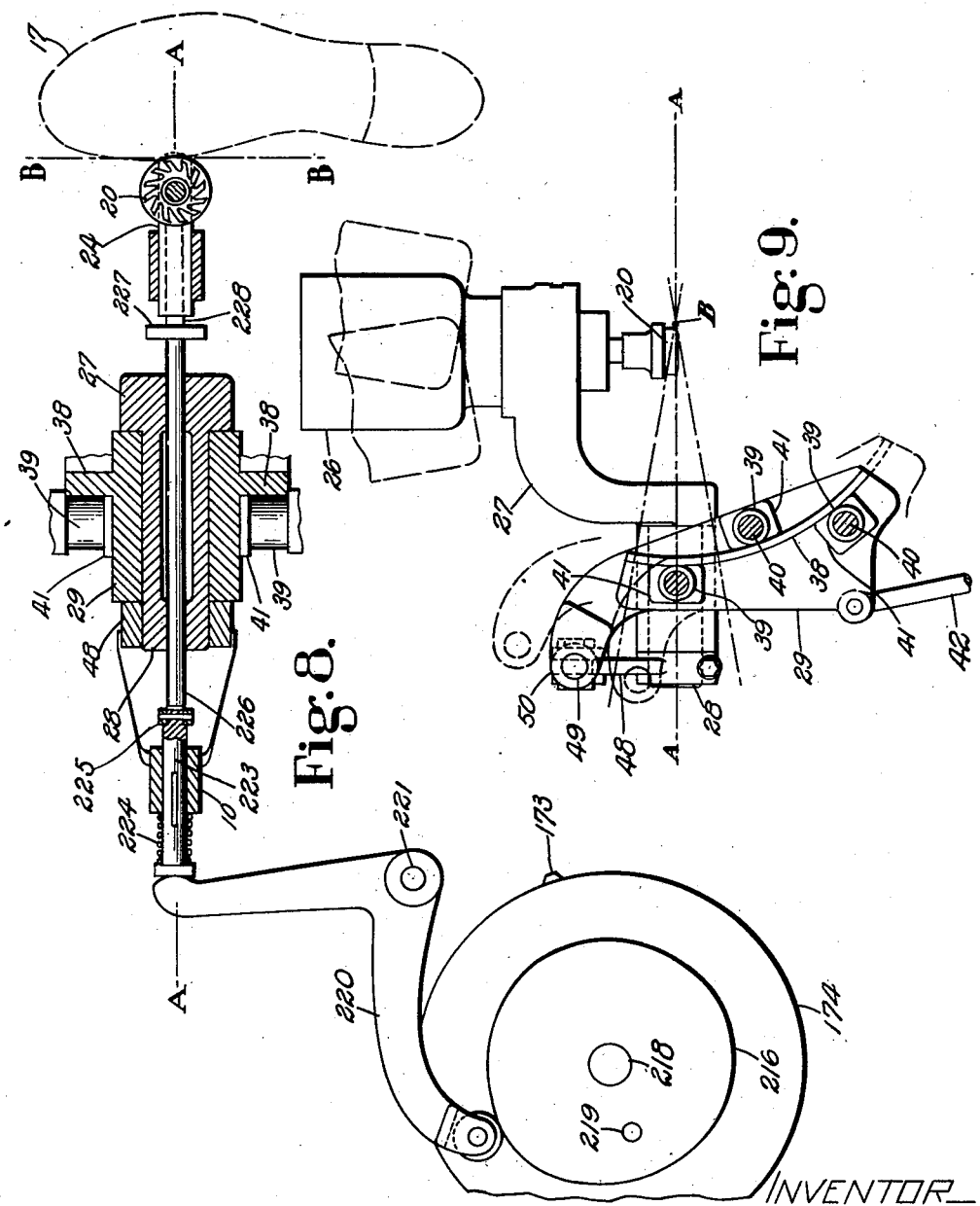

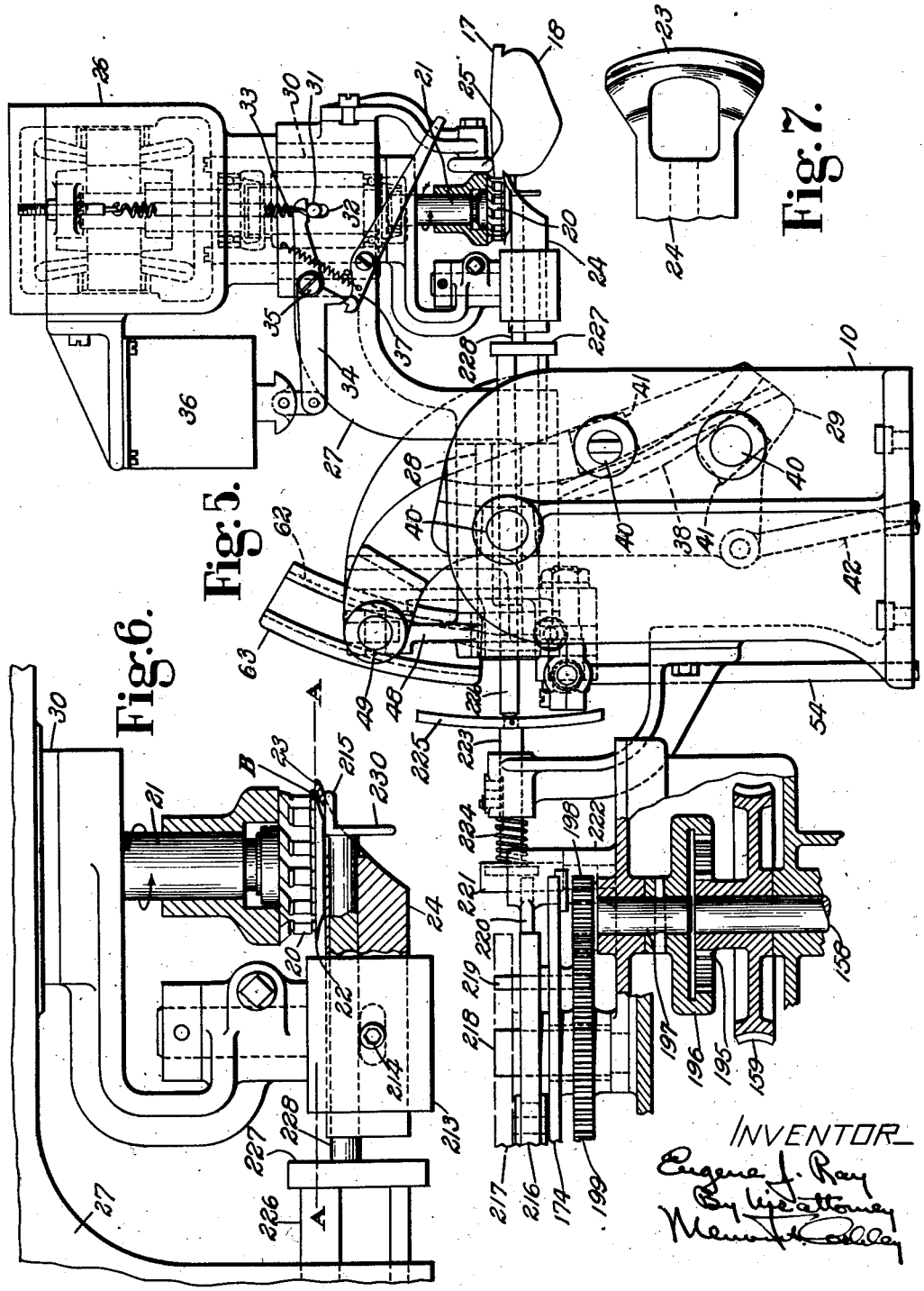

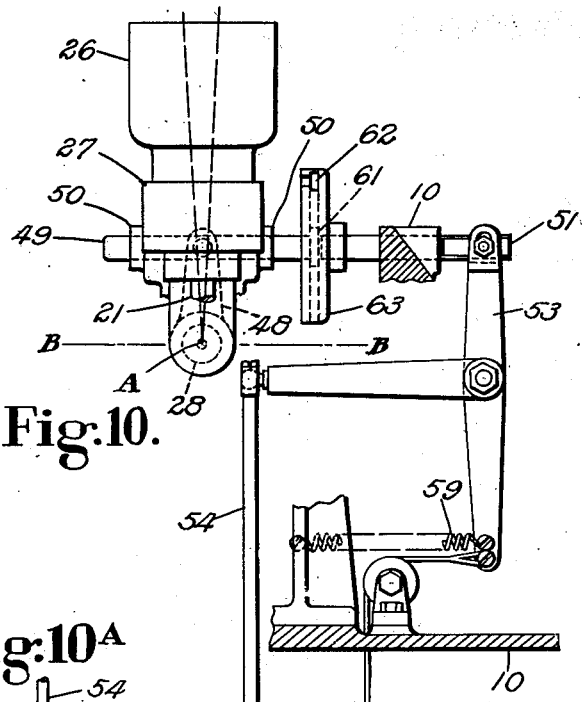
Fig. 10.
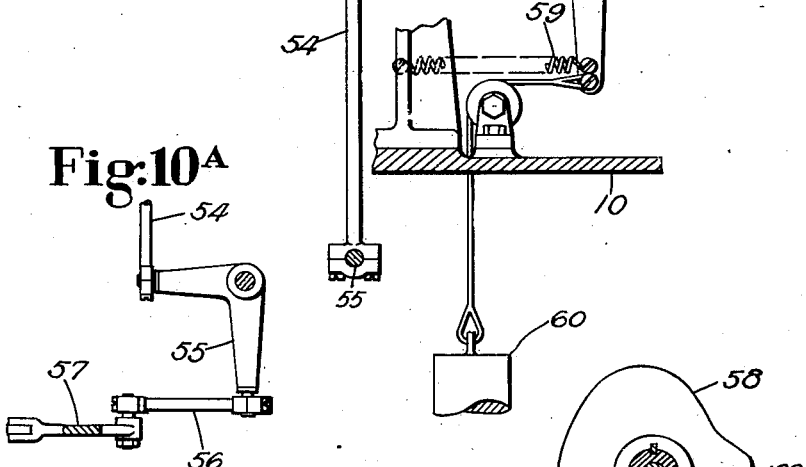
Fig. 10A.
Fig. 11.
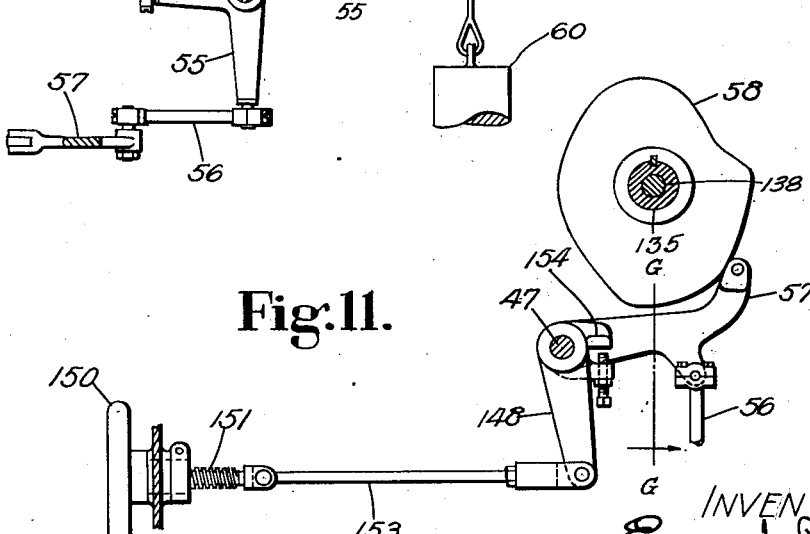

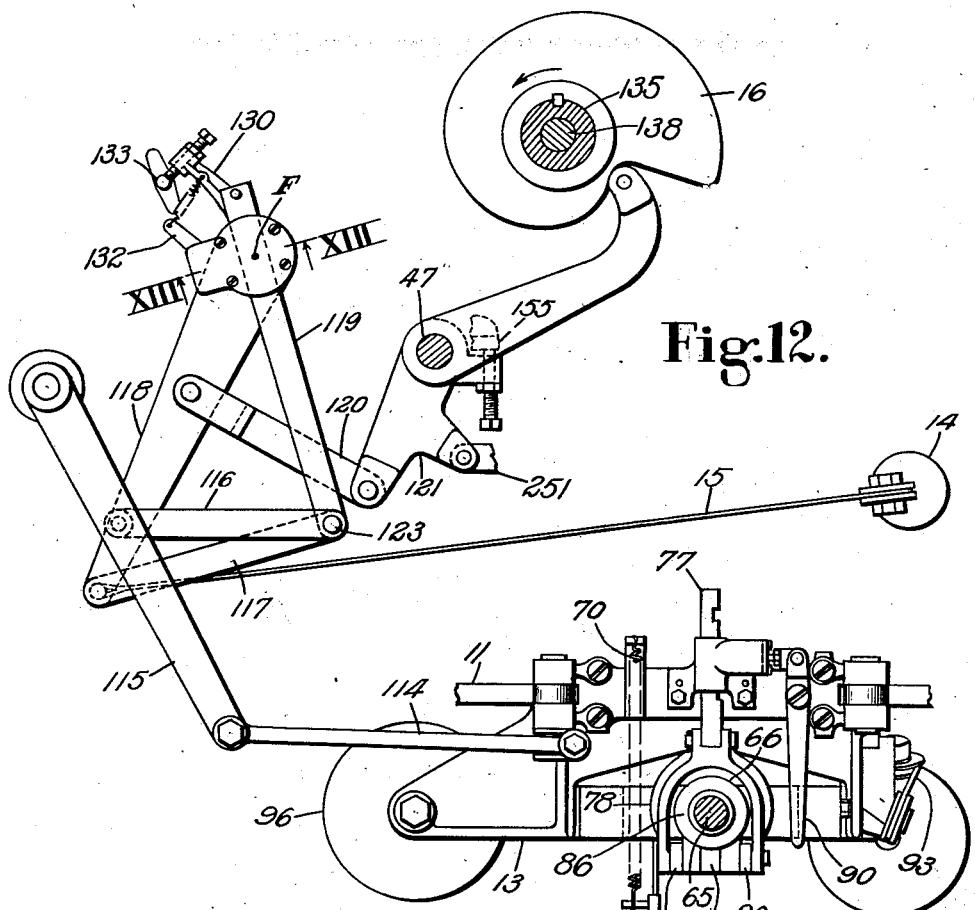
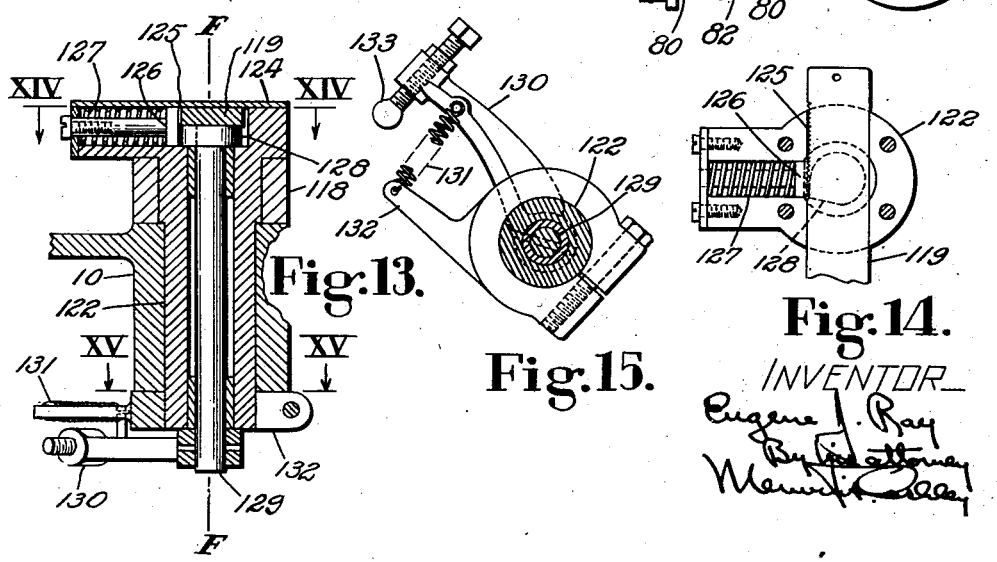

Feb. 6, 1945.  E. J. RAY  2,368,878
AUTOMATIC SHOE MACHINE
Filed May 26, 1943  14 Sheets-Sheet 9

INVENTOR
Eugene J. Ray
By his attorney

Feb. 6, 1945.  E. J. RAY  2,368,878
AUTOMATIC SHOE MACHINE
Filed May 26, 1943  14 Sheets-Sheet 10

Feb. 6, 1945.  E. J. RAY  2,368,878
AUTOMATIC SHOE MACHINE
Filed May 26, 1943   14 Sheets-Sheet 11

INVENTOR
Eugene J. Ray

Feb. 6, 1945.   E. J. RAY   2,368,878
AUTOMATIC SHOE MACHINE
Filed May 26, 1943   14 Sheets-Sheet 12

Fig. 23.

INVENTOR
Eugene J. Ray
By his attorney

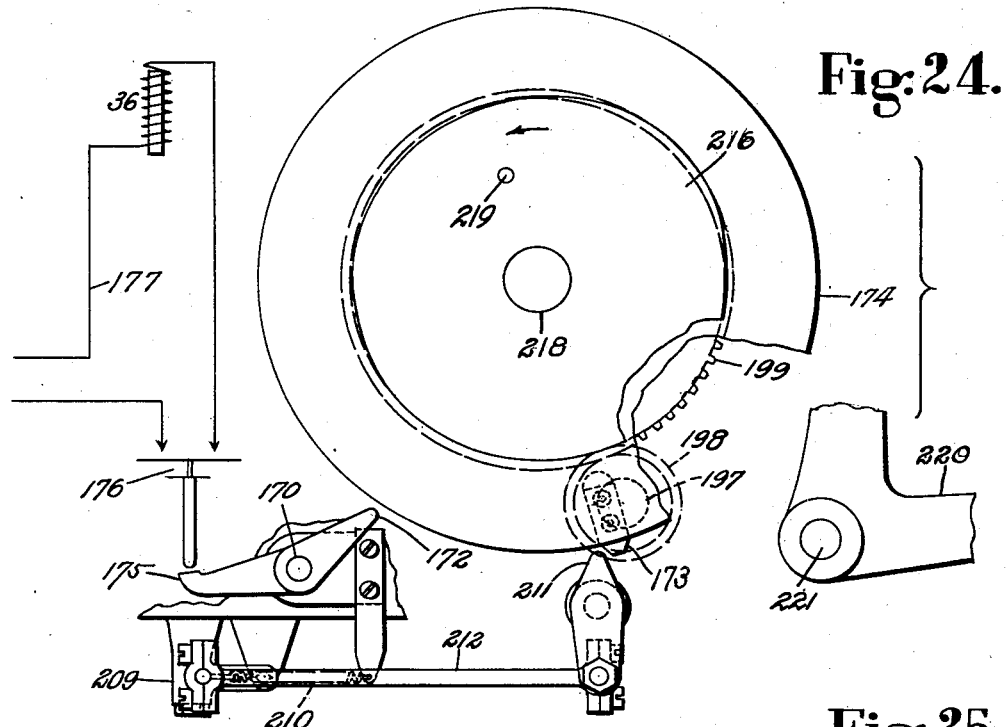
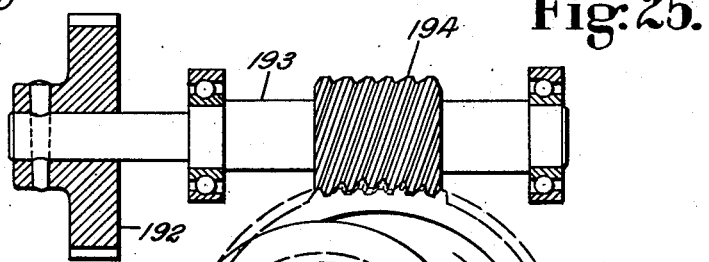
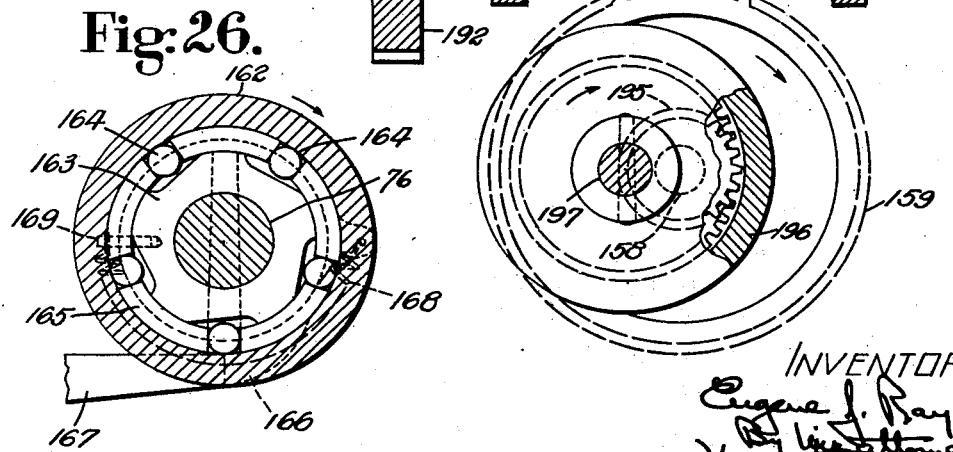

Feb. 6, 1945.   E. J. RAY   2,368,878
AUTOMATIC SHOE MACHINE
Filed May 26, 1943    14 Sheets-Sheet 14

INVENTOR
Eugene J. Ray
By his Attorney

Patented Feb. 6, 1945

2,368,878

UNITED STATES PATENT OFFICE 2,368,878

AUTOMATIC SHOE MACHINE

Eugene J. Ray, Beverly, Mass., assignor to United Shoe Machinery Corporation, Flemington, N. J., a corporation of New Jersey Application May 26, 1943, Serial No. 488,483

34 Claims. (Cl. 12—17)

The purpose of the present invention is to provide improvements in automatic shoe machines of the type in which a shoe is fed and turned end for end with respect to a power-operated instrumentality that remains in one locality to operate progressively on the margin or perimeter of the shoe bottom. Among the operations in this category are inseaming, inseam trimming, outsole stitching, edge trimming and edge setting.

One of the problems common to all machines of the type mentioned is due to the lengthwise and widthwise curvatures of the shoe bottoms. These curvatures, unless something were done to counteract the effects of the various slopes produced by them, would disturb the normal relation between the work and the instrumentality that performs the operation. For this reason automatic machines of the type mentioned have heretofore included means for rolling a shoe sidewise to counteract the slopes due to transverse curvatures, and means for pitching the shoe to counteract the slopes due to lengthwise curvatures. These rolling and pitching motions, when imparted to the shoe, must also be imparted to a heavy jack by which the shoe is carried. Moreover, they modify the effects of the cams by which the shoe is fed and turned end for end, with the result that it is exceedingly difficult to coordinate the four cams comprised in a set required to produce all the motions above specified. This problem is further complicated by two other motions, one of which is necessary to enable the operation to progress according to the plan configuration of the shoe bottom, and the other of which is necessary to counteract heightwise factors due to the spring and arch of the shoe bottom.

To simplify the problem of designing the several cams for any selected style of shoe, and at the same time to insure improved control and timing of the several motions, one of the improvements provided by the invention consists in power-operated means for imparting the roll and pitch motions not to the shoe and the jack, but to the instrumentality that performs the operation on the shoe, in combination with power-operated means for imparting the feed motion to a work-carriage and the turning motion to the shoe and the jack.

This divorcement of the roll and pitch motions from the recipient of the feed and turning motions permits other improvements embodied in the means for feeding and turning the shoe. For example, the feed motion is imparted to a feed-carriage that travels to and fro in a straight path and carries a jack on which the shoe is mounted. The jack-post is arranged to turn about its own axis to turn the shoe end for end, and is also arranged to swing about a fixed axis parallel with the path of the feed carriage to counteract curvatures in the plan configuration of the shoe bottom. Moreover, the jack-post is arranged to move up and down along its own axis within limits corresponding to the heightwise curvatures of the shoe bottom above mentioned, and in so doing to maintain the point of operation at a constant level without any heightwise movement of the feed-carriage.

The illustrated machine is equipped with a high-speed rotary cutter for trimming the edge of the sole of a shoe, and this trimming instrumentality is a part of an operating unit to which the aforesaid roll and pitch motions are imparted independently of the motions imparted to the shoe. The roll motion is an angular motion about a fixed axis parallel with the path of the feed-carriage, while the pitch motion is one about an axis that intersects the roll axis and lies at right angles thereto and at right angles also to the rotational axis of the cutter.

One of the improvements embodied in this organization consists in locating the point of intersection of the roll axis and the pitch axis at the point of tangency of the perimeter of the cutter and the trimmed perimeter of the sole. This point of coincidence is fixed in space and is preferably located in the plane of the welt surface, if the shoe has a welt, or the corresponding surface of a shoe that has no welt. Consequently, the plan configuration generated by the trimming cutter will not be modified in the plane of the welt surface but will be developed strictly in accordance with the shape of the body of the shoe or a pattern cam, as the case may be.

Referring to the drawings which illustrate an automatic edge trimming machine embodying the improvements hereinafter described, Fig. 1 is a front elevation in which a shoe is in contact with the trimming cutter as at the starting point of the trimming operation;

Fig. 5 is an elevation, as viewed in Fig. 2 but partly in section, of the trimming unit and the mounting by which it is supported and rocked to give it rolling and pitching motions;

Fig. 6 is a large scale view of the trimming cutter as viewed in Fig. 5 and the trimming guides supported below it;

Fig. 7 is a top plan view of the work-engaging portion of one of the trimming guides included in Figs. 5 and 6;

Fig. 8 is a top plan view, partly in horizontal section, of mechanism included in Fig. 5 for producing a Baltimore edge;

Fig. 9 is a diagrammatic view from the standpoint of Fig. 5 but representing the principle of the rolling motion of the trimming unit;

Fig. 10 is a front elevation of the trimming unit (compare with Fig. 1) and the connections for producing its pitching motion;

Fig. 10A is a side elevation, partly in section (line G—G in Fig. 11), of some of the elements of the linkage by which the trimming unit is rocked sidewise as indicated in Fig. 10 by the cam shown in Fig. 11. The direction of view of Fig. 10A is the same as that of Fig. 2;

Fig. 11 is a top plan view of an assemblage included in Fig. 3 and comprising means for rocking the trimming unit sidewise and means for retracting all the cam arms from their cams when the latter are to be shifted along their axis;

Fig. 12 is a top plan view including the feed-carriage, a feed cam and a pantographic mechanism by which the carriage is operated;

Fig. 13 is a vertical section through the means for locking the pantograph (see line XIII—XIII in Fig. 12);

Fig. 14 is a top plan view of the locking means in the plane of line XIV—XIV in Fig. 13;

Fig. 15 is a horizontal section of means for controlling the locking means (see line XV—XV in Fig. 13);

Fig. 23 is a top plan view, partly in section, of parts of the power assemblage (see upper left of Figs. 1 and 2 for location) by which the several trains of mechanism are actuated;

Fig. 24 is a top plan view (compare with Fig. 8) of a driven assemblage including an automatic stop mechanism;

Fig. 25 is a top plan view, partly in section, of intermediate gearing (see upper right of Fig. 4) located at a level above the gearing included in Fig. 23;

Fig. 26 is a horizontal section (compare with Fig. 23) of a roller clutch (see line XXVI—XXVI in Fig. 20);

Figure 1:
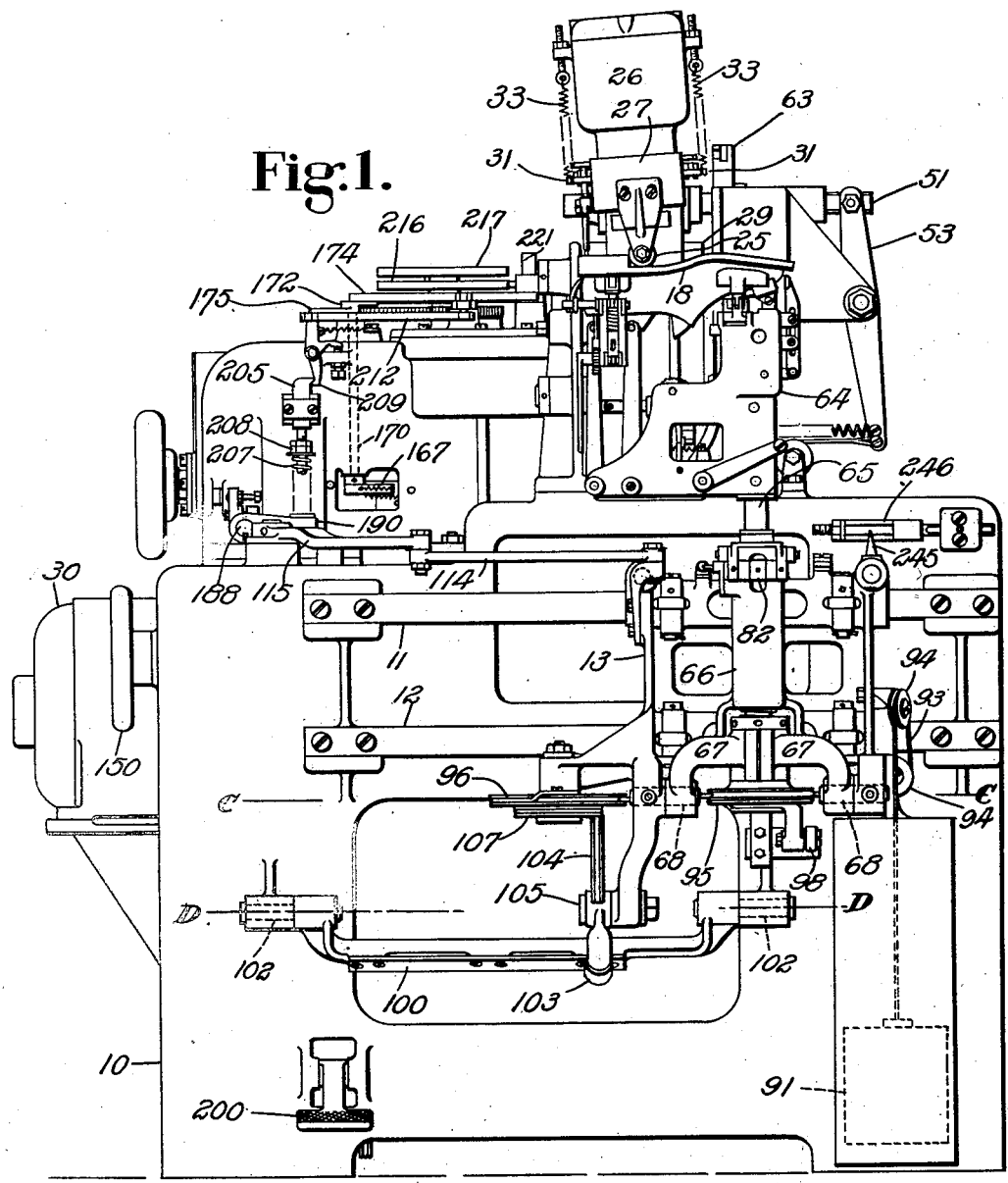
Fig. 1A is an elevation of a size gauge (see Fig. 1, right) for indicating the starting position.

Wherever the numeral 10 is applied to an element it designates a part of the stationary frame structure regardless of how the latter is made up of its constituent parts. Two parallel horizontal rails 11, 12 affixed to the front of the frame provide a track on which a carriage 13 is arranged to travel in a straight horizontal path to feed a shoe lengthwise. The carriage is provided with antifriction rollers that run on the rails. A counterweight 14 and a flexible cable 15 (Figs. 3 and 12) pull the carriage to the right after each trimming operation. The feed motion from right to left is produced by a cam 16 and linkage including a pantograph by which the range of the carriage may be graded according to the length of a shoe. The details of this linkage are hereinafter described.

Figure 3:
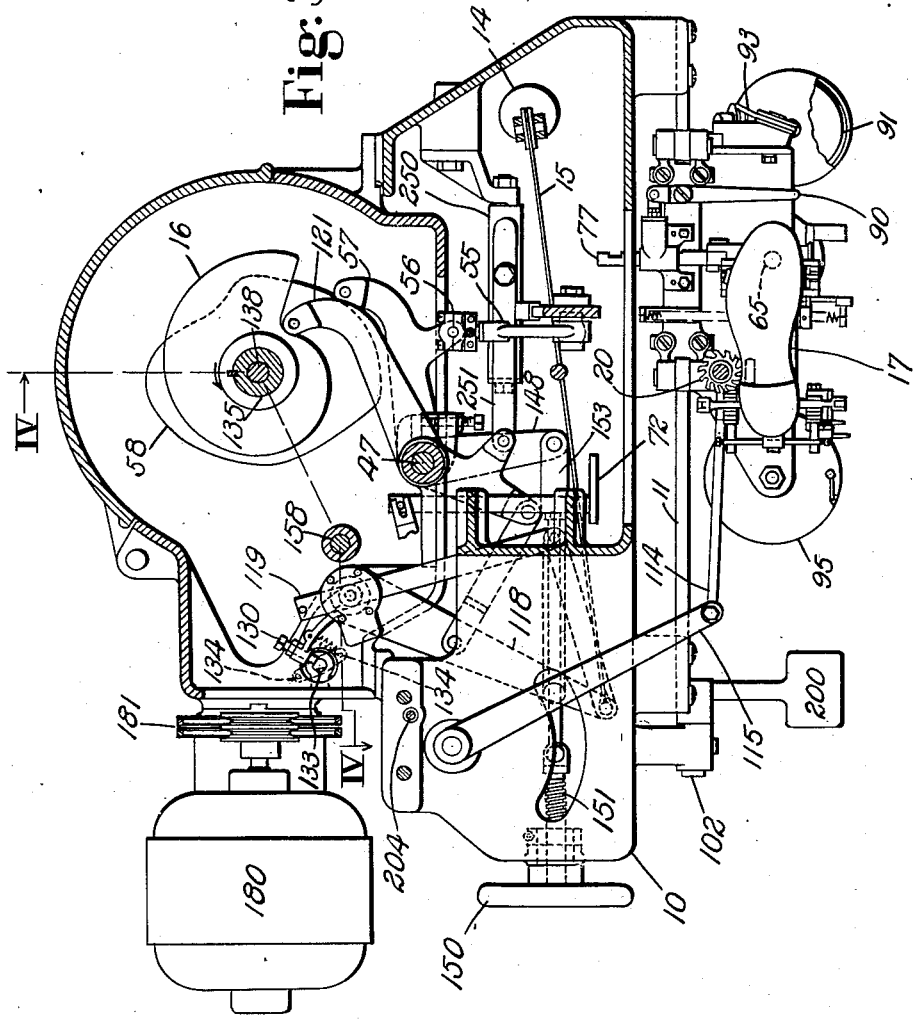
Fig. 3 is a plan view partly in horizontal section.
Figure 19:
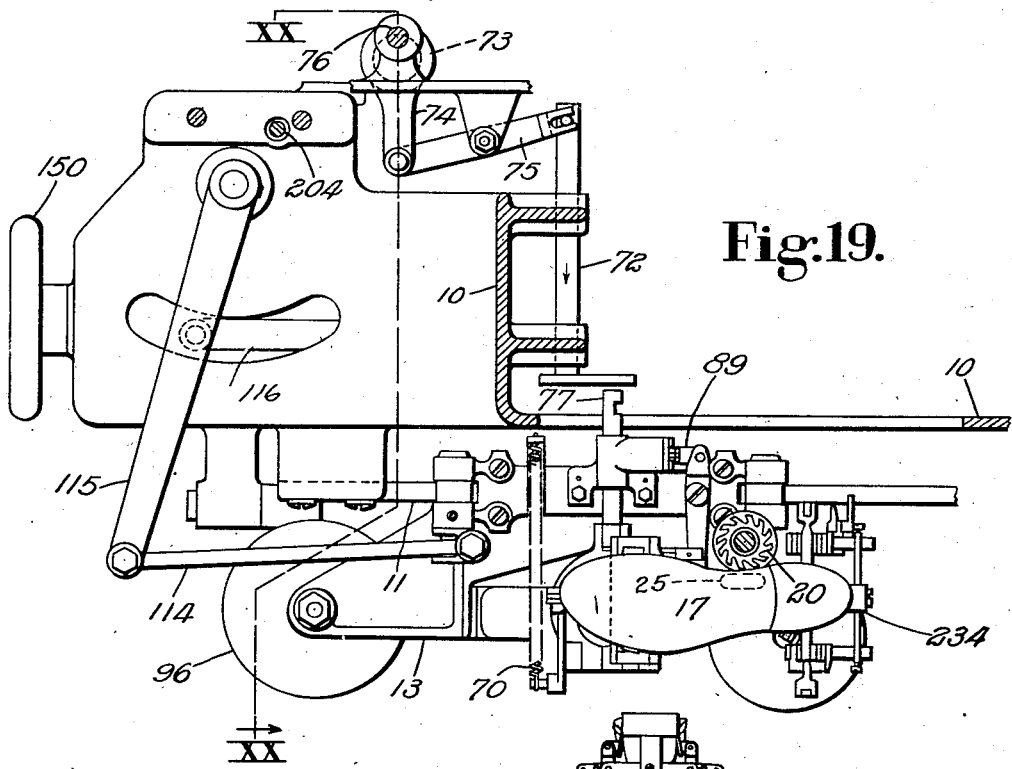
Fig. 19 is a top plan view including the feed-carriage and mechanism for displacing a shoe from the cutter at the conclusion of the trimming stage (compare with Figs. 3 and 12)

The perimeter of the sole 17 of a shoe 18 is trimmed progressively along both sides and around the toe end by a rotary cutter 20 (Figs. 5, 6, 8, 9 and 19) of common design comprising a series of teeth each provided with a cutting edge. The machine is so organized that the trimming begins at or near the breast line on one side, as shown in Fig. 3, and ends at a corresponding point on the opposite side, as shown in Fig. 19, but after completion of the trimming operation the shoe is displaced from the cutter and the parts thereafter return to their initial positions before all automatic operation is stopped.

The cutter 20 is affixed to the lower end of an upright shaft 21 by a circular disk or shield 22 the margin of which projects slightly beyond the cutting edges and provides a ledge to be overlapped and engaged by the marginal extension of a sole 17. A supplemental ledge 23 arranged to ride the lower surface of the marginal extension is formed on a block 24 (Figs. 6 and 7). In operation the ledge 23 and the cutter are upheld or floated by springs and governed with regard to height by the overlapping marginal extension of the sole. The cutter 20 is thus moved up and down as the thickness and heightwise curves of the marginal extension require such movements to maintain true register of the cutter and the work.

Once a shoe has been jacked and placed in contact with the cutter it is upheld by a spring that maintains the tread surface of the sole against the bottom of a roll 25 that constitutes a height gauge or tread rest. The elements 20, 24 and 25 are all included in an assemblage that rocks about two axes to counteract lengthwise and crosswise curvatures of the shoe bottom. This assemblage also includes an electric motor 26 for driving the cutter. The casing of the motor is affixed to a support 27 which, as shown in Figs. 5, 8 and 9, is provided with a cylindrical stem 28. The axis A—A of this stem is one of the two axes above mentioned. The stem 28 is journaled in a bearing in another movable support 29, and the latter is arranged to rock about a fixed horizontal axis indicated by a dot B in Figs. 6 and 9 and by a broken line B—B in Figs. 8 and 10. The axis B is parallel with the path of the feed-carriage 13, but since the support 29 rocks about it the axis A—A will partake of such rocking.

Moreover, the axis B is tangent to the perimeter of the cutter at the trimming locality and is preferably at or slightly above the mean level of the ledge 23. The axis A intersects the axis of rotation of the cutter. It also preferably intersects the axis B at the trimming locality and lies at right angles to it. Consequently, although the axis of the cutter may be rocked forward and back (Fig. 9) as well as sidewise (Fig. 10), the operative portion of the cutter will remain at the point of intersection of the axes A and B. The location of this point is fixed. The point of contact between the sole and the height gauge 25 is as near as it may be to this point of intersection, with due allowance for the thickness of the sole.

The cutter shaft 21 (Fig. 5) is journaled in an axially movable sleeve 30 that provides radial and thrust bearings and has an arm by which the member 24 is carried up and down with the cutter. Diametrically opposite pins 31 affixed to the sleeve project through slots 32 in the support 27 and are normally drawn upward by tension springs 33 to keep the ledge 23 against the welt or extension of a sole, but may be pressed down by levers 34 mounted on the support 27 and connected thereto by fulcrum studs 35. Both levers 34 are connected to the active element of a solenoid 36 carried by the casing of the motor. The duty of the solenoid is to depress the cutter and the ledge 23 slightly at the conclusion of the trimming stage. When this occurs they are automatically caught and maintained at their lower level to enable the sole of the next shoe to take its position under the height gauge 25. For this purpose a spring-stressed latch 37 is arranged to cooperate with a projection formed on one of the levers 34.

To constrain the support 29 (Figs. 5 and 9) to rock about the axis B without occupying any space required by the cutter and the block 24, this support is provided with a pair of arcuate cylindrical flanges 38, one at each side, and each flange is guided by three rolls 39, one engaging its concave surface and two engaging its convex surface. The rolls are mounted on stationary studs 40 each provided with a head 41. The studs are axially adjustable and their heads are arranged to be seated against flat parallel faces of the support to prevent sidewise movement of the latter without obstructing angular movement about the axis B. The center of curvature of the flanges 38 coincides with axis B.

Figure 18:
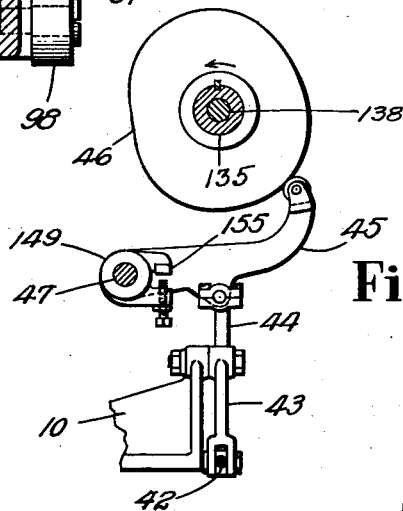
Fig. 18 is a top plan view of a cam and connections for imparting rolling motions to the trimming unit. Their location is indicated by dotted lines in the lower part of Fig. 2.

The train of mechanism for operating the support 29 comprises a link 42 (Fig. 2), a bell crank 43, a link 44, a lever 45 (Fig. 18, plan view) and a cam 46. The lever 45 is loosely mounted on a rockshaft 47 which serves as its fulcrum. The load carried by the support 29 utilizes the force of gravity to maintain the lever 45 against the cam 46.

The train of mechanism for rocking the support 27 (Fig. 9) about axis A comprises an upright arm 48 affixed to the stem 28 (Fig. 10), a rod 49 movable endwise in bearings 50 in the support 29, a rod 51 movable endwise in a fixed bearing in the frame 10, a three-armed lever 53, a link 54, a bell crank 55 (Figs. 3 and 10A), a link 56, a lever 57 and a cam 58. The rockshaft 47 serves as the fulcrum of the lever 57, and the latter is held against its cam by a spring 59 (Fig. 10) and a counterweight 60 both connected to the lever 53. The operating connection between the rods 49 and 51 is designed to absorb the up and down movements of the rod 49 due to rocking the support 29 about axis B. For this purpose a head 61 formed on the rod 49 is located in an undercut groove 62 formed in a quadrant 63 affixed to the rod 51. The groove is arcuate (Fig. 5) and its radial center coincides with axis B.

Figure 21:
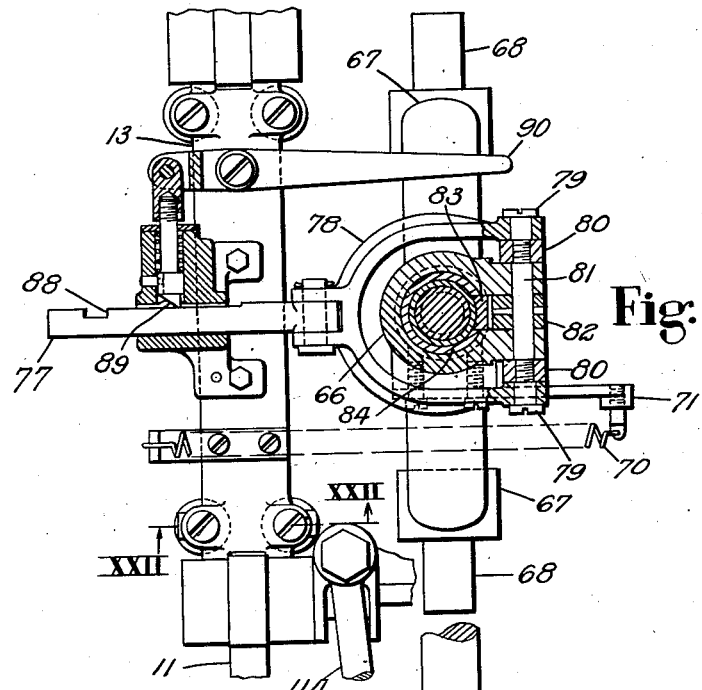
Fig. 21 and Fig. 22 are respectively a horizontal section (compare with Fig. 12) and a vertical section (compare with Fig. 20) of automatic mechanism for fixing the height of the jack-post and latching the jack in a retracted position.
Figure 22:
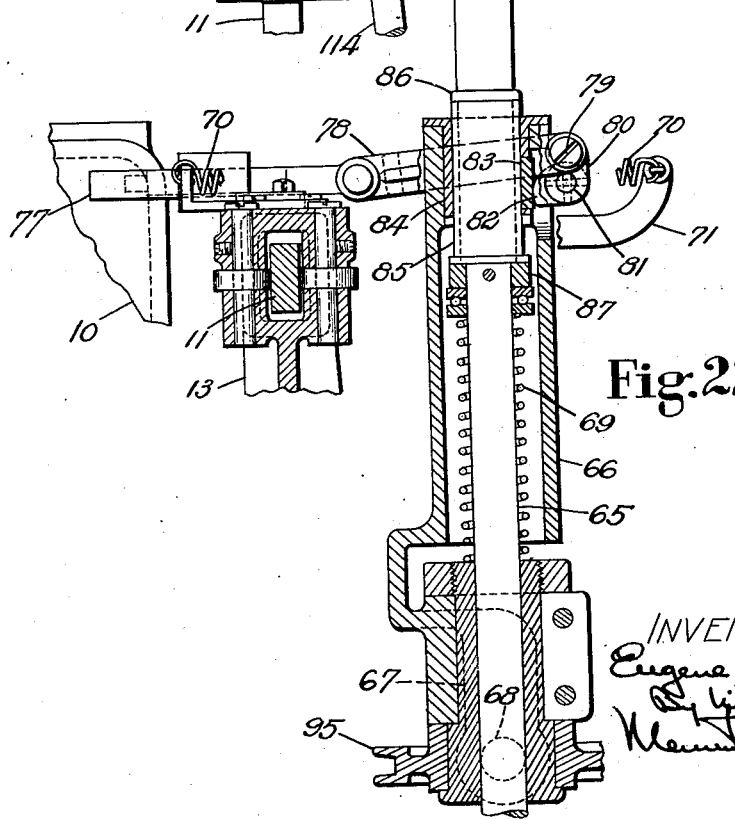

The shoe carrier, hereinafter termed "jack," includes a head 64 (Fig. 1), a jack-post 65 and various other elements. The head is affixed to the jack-post and the latter is not only carried sidewise by the carriage 13 but is also capable of turning about its own axis, moving up and down lengthwise of its axis and tilting about a fixed horizontal axis C—C that lies parallel with axis B—B and with the path of the carriage. The jack-post extends through, above and below a bearing sleeve 66 having a pair of arms 67 connected to the carriage by trunnions 68. These trunnions lie on the axis C—C and constrain the jack to tilt to an upright position for a trimming operation and to lean forward between trimming operations. A compression spring 69 (Fig. 22) surrounds the jack-post and normally raises it to maintain the tread face of a sole against the height gauge 25 (Fig. 5) during the time allotted to trimming. The perimeter of a shoe sole is normally drawn against the cutter by a tension spring 70 (Figs. 19 and 21) one end of which is anchored to the carriage 13 and the other end attached to a finger 71 carried by the bearing sleeve 66.

At the conclusion of a trimming operation, but before the shoe is removed from the cutter 20 it occupies the position shown in Fig. 19. At this stage a plunger 72 is operated to tilt the bearing sleeve 66 forward about axis C—C, but the primary result of operating this plunger is to secure the jack-post against upward movement before the shoe leaves contact with the height gauge 25. The plunger 72 derives its motion from an eccentric 73 with which it is connected by an eccentric strap 74 and a lever 75. The eccentric is carried by a shaft 76 that remains at rest except when the stage in question is reached, whereupon it receives one revolution from a clutch hereinafter described.

When the plunger 72 is operated its forward end strikes and moves a rod 77 (Fig. 21) arranged in a bearing carried by the carriage 13. This rod carries a yoke 78 that straddles the bearing sleeve 66 and has pivots 79 by which its arms are connected to a pair of levers 80 both affixed to a rockshaft 81. A cam 82, also affixed to the rockshaft, engages a clamping pad 83 closely but not tightly fitted into an opening in a bushing 84. This bushing is affixed to the sleeve 66 and provides a bearing for an inner bushing 85 through which the jack-post extends. The jack-post may turn with respect to the bushing 85 but may not move up or down except when the bushing 85 is free to do so, because this bushing is confined between collars 86 and 87 fixed to the post.

In operation, the pull of the spring 70 resists the thrust of the plunger 72. Consequently, the first effect of the plunger is to set the clamping pad 83 against the bushing 85 with enough force to secure it despite the lifting force of the spring 69. When the clamping movement is arrested by the bushing 85 the remainder of the forward travel of the plunger tilts the jack about axis C—C and thereby carries the shoe away from the height gauge 25. A shoulder 88 on the rod 77 is thereby carried beyond a spring-stressed latch 89 which drops behind it to maintain the jack in its forward position (see dotted lines at right of Fig. 2) when the plunger 72 is retracted. The carriage 13 is provided with a hand lever 90 by which the latch 89 may be pulled out when the next shoe is ready to be presented to the cutter in the position represented in Fig. 3.

Figure 16:
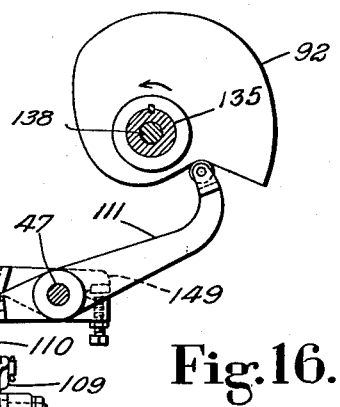
Fig. 16 is a top plan view of the mechanism for turning a shoe end for end.
Figure 17:
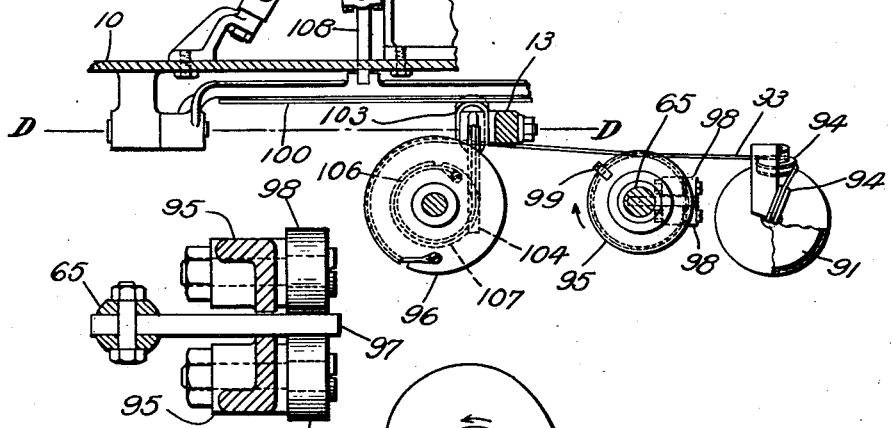
Fig. 17 is a horizontal section of a detail of the turning mechanism included in Fig. 16, the detail appearing also in Fig. 1 between lines C—C and D—D.

Viewed from above (see Fig. 16) the jack-post 65 is normally turned in a clockwise direction by a counterweight 91 and in the opposite direction by a train of connections that derive their operating motion from a cam 92. A flexible cable 93 extends from the weight 91 around sheaves 94, 94, thence around a pulley 95 in one complete convolution, and thence around a segment of a pulley 96 to which it is anchored. The pulley 95 surrounds the jack-post 65 in the plane of the axis C—C and has a spline connection with the post that enables the latter to slide up and down without moving the pulley. The spline 97 (Figs. 1 and 17) is flanked by two rolls 98 both carried by the pulley. The cable is fastened to the pulley 95 by a clip 99.

A bar 100 (Fig. 1) for turning the jack-post 65 is arranged to oscillate about a fixed axis D—D that lies parallel with the path of the carriage 13. The operating surface of this bar is flat and it also lies parallel with the path of the carriage. The ends of the bar are connected to the frame 10 by trunnions 102. As the carriage is moved to and fro along its track 11, 12 the operating surface of the bar 100 is traversed lengthwise by a roll 103 mounted on a quadrant 104 (Fig. 2). The latter is carried by an arm of the carriage and is connected thereto by a fulcrum stud 105 the axis of which coincides with the axis D—D. One end of a flexible cable 106 is anchored to this quadrant and the other end is anchored to a pulley 107 formed on or affixed to the pulley 96. These pulleys are mounted on the carriage 13 and are constantly stressed by the weight 91 to keep the roll 103 in contact with the bar 100.

Figure 20:
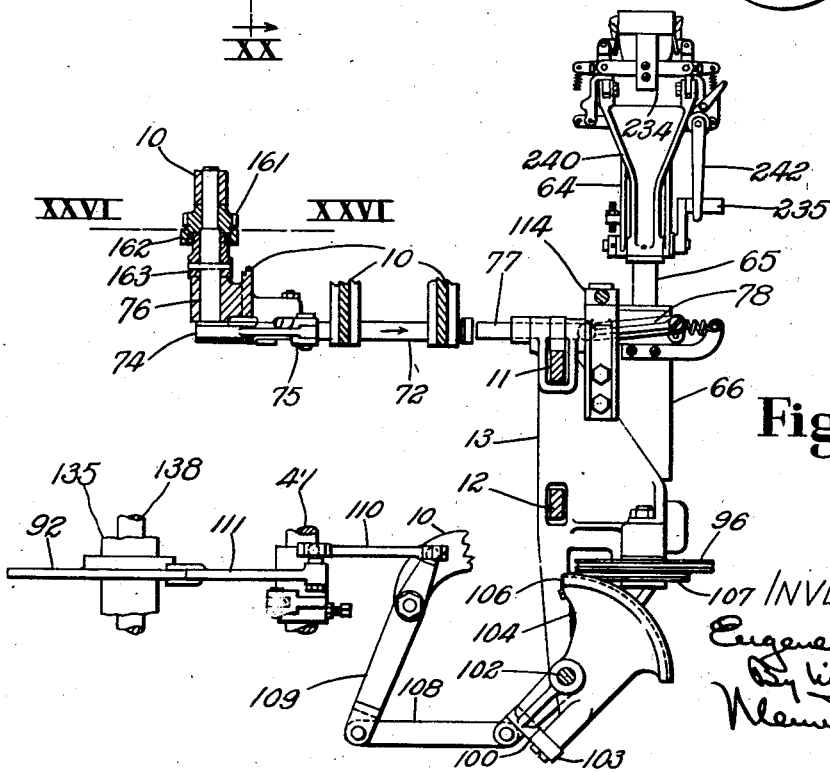
Fig. 20 is a side elevation of the feed-carriage and the jack standing as in Fig. 2 but including a partial section indicated by line XX—XX in Fig. 19.

The motion for operating the bar 100 is derived from a train of mechanism (Fig. 2) comprising a link 108, a lever 109, a link 110, a lever 111 (Fig. 16) and a cam 92 (see also Fig. 20). The lever 109 is mounted on the frame 10 but the lever 111 is loosely mounted on the rockshaft 47 which serves as its fulcrum. The constant pressure of the roll 103 against the bar 100 keeps the lever 111 against its cam.

The linkage for moving the carriage 13 to and fro along the rails 11 and 12 (Figs. 3 and 12) includes a link 114, a pivoted arm 115, a link 116, pantograph members 117, 118 and 119, a link 120, and a lever 121 engaging the feed cam 16. The rockshaft 47 serves as a fulcrum for the lever 121 but is not turned by it. The arm 118 is mounted on a sleeve 122 (Fig. 13) arranged in a bearing in the frame 10 and constrained to oscillate about a fixed vertical axis F—F. The link 116, the radius bar 117 and the locking bar 119 are all connected by a common pivot 123. Since the link 116 is carried by the arm 115 while the bar 117 is carried by the arm 118, adjusting the pivot 123 toward or from axis F will decrease or increase the angular range of the arm 115 and in corresponding degree alter the length of traverse of the carriage 13. The operator will adjust the pantograph according to the length of a shoe, but to do so he has only to give the carriage an intial setting.

The pantograph is provided with means by which the bar 119 is automatically locked with respect to the sleeve 122 in consequence of depressing a treadle 200 to trip the machine into operation, and automatically unlocked in consequence of one revolution of the cam 16. The pantograph is therefore free to be adjusted during the periods of rest, and such adjusting is effected by moving the carriage 13 manually along its track to a starting position consistent with the length of a shoe about to be trimmed. At such times the lever 121 is held against its cam 16 by the weight 14 while the carriage and the arm 115 are released and free. A size gauge hereinafter described is provided to enable the operator to find the desired initial setting of the carriage for this purpose.

Referring to Figs. 13 and 14, the locking bar 119 extends through a groove in the upper end of the sleeve 122 and is retained therein by a cover plate 124. One side of the bar is provided with a series of locking teeth 125 to be engaged by complemental teeth formed on a locking dog 126 normally pressed against the bar by a compression spring 127. The lower portion of the dog (Fig. 13) has no teeth but only a smooth surface to be engaged by a cam 128 that underlies the bar 119. The purpose of the cam is to disengage the dog from the teeth 125. The cam is formed on a stem 129 that has bearings in the sleeve and projects below the latter where an operating arm 130 is affixed to it. One end of a tension spring 131 is attached to the arm 130 and the other end is attached to an arm 132 affixed to the sleeve 122. These parts are so related that when the spring 131 is unopposed it will disengage the cam from the dog 126 and permit the latter to lock the bar 119. This condition is the one that prevails while the cam 16 is in operation, but when, at the conclusion of a cycle of revolution, the high part of the cam leaves the lever 121, the pantograph assemblage will be turned counterclockwise by the weight 14. During the final stage of this turning the arm 130 will encounter a vertical pin 133 (Figs. 2 and 3) and be arrested thereby while the sleeve 122 continues to turn slightly farther. At this stage the overtravel of the sleeve with respect to the cam 128 (Fig. 14) will disengage the dog 126 from the teeth 125 and leave the bar 119 and the arm 115 free for the next setting. The arresting pin 133 is normally raised by a tension spring 134 (Fig. 2) into the path of the arm 130 but may be drawn down to release the arm when the machine is about to begin a trimming operation.

The cam assemblage (Fig. 4) includes thirty-two cams all arranged in a single stack and strung on a sleeve 135 to which they are keyed by one long key 136. The cams are assembled in four groups of eight in each group, but in the drawing of the assemblage only the lowest cam of each group is shown in section. These are (reading up) the roll cam 46 for a right shoe, the turning cam 92 for a right shoe, the pitch cam 58 for a right shoe and the feed cam 16 for a right shoe, all designed for one style of last. The seven other cams of each group are indicated with dotted lines and their margins broken away. This equipment provides for operating on four styles with one set of thirty-two cams, the first and second cams of each group being mated as right and left for one style, the third and fourth as right and left of another style, and so on.

A gear 137 affixed to the sleeve 135 provides for driving the cam assemblage. This sleeve may be adjusted lengthwise to place any set of four coordinated cams in cooperative relation to the four levers 45, 111, 57 and 121. The sleeve surrounds and engages an adjusting shaft 138 but is not keyed thereto. An arm 139 affixed to the upper end of the shaft is provided with a locking pin 140 arranged to enter a socket 141 in the frame 10, and the pin is provided with a handle 142 by which it may be withdrawn from its socket and by which the shaft may be rotated. The lower end of the shaft is provided with a coarse screw thread 143 the pitch of which is commensurate with the distance from the bottom of each cam to the bottom of the next. The sleeve is supported by a nut 144 arranged to slide up and down in a socket 145 and prevented from turning by a spline 146. A collar 147 affixed to the sleeve supports the stack of cams. One revolution of the shaft 138 will remove one set of four cams from their operative positions and place another set in those positions, but to facilitate such shifting the machine is provided with means by which the levers 45, 111, 57 and 121 may all be retracted far enough to insure clearance.

For the purpose last mentioned, a lever 148 is affixed to the rockshaft 47 between the levers 57 and 121, and an arm 149 is located between the levers 45 and 111 and likewise affixed to the rockshaft. A hand wheel 150 (Figs. 1, 2 and 3), the hub of which has a bearing in the frame 10, is connected to the lever 148, the connections including a screw shaft 151 and a link 153. The hub of the hand wheel has an inside thread and constitutes a nut for moving the shaft 151 endwise. The lever 148 (Fig. 4) has two lugs 154 one projecting up to engage a corresponding lug on the lever 121 and the other projecting down to engage a lug on the lever 57. Likewise the arm 149 has two lugs 155, one for engaging a lug on the lever 111 and the other for engaging a lug on the lever 45. When the rockshaft 47, as viewed in Figs. 3, 11, 12, 16 and 18, is turned clockwise by the hand wheel 150 the levers 121, 57, 111 and 45 are retracted all at once from their cams. After the shifting of cams has been effected the hand wheel will be let off to place the levers under control of their respective cams.

Rotation is transmitted to the gear 137 (Fig. 4) by a train including a long pinion 157, a shaft 158 keyed to the pinion, a worm wheel 159 and other elements hereinafter described. The axial extent of the pinion is sufficient to maintain driving engagement with the gear 137 wherever the latter may be adjusted by the screw shaft 138. This pinion also transmits rotation to the eccentric 73 through a train including an intermediate gear 160, a gear 161 formed on the driving member 162 of a roller clutch, the driven clutch member 163 and the shaft 76. The eccentric 73 is the actuator by which the jack is tilted forward to remove the shoe from the cutter at the conclusion of the trimming stage.

The driving member 162 of the roller clutch rotates throughout the entire operating cycle of the machine, but the driven member 163 remains at rest until the trimming is completed, whereupon it is tripped into operation for one revolution and then stopped. As shown in Fig. 26 (last sheet), a series of rollers 164 and an annular roller cage 165 are interposed between the clutch members. A stop shoulder 166 formed on the cage abuts initially a stop finger 167 movable to and from its path of rotation. One end of a tension spring 168 is attached to a pin 169 carried by the driven member 163, and the other end is attached to a lug on the cage, but so long as the cage is arrested the driving member 162 may rotate without driving the member 163. Operation of the clutch is caused by displacing the finger 167 from the shoulder 166. The finger is affixed to the lower end of a vertical rockshaft 170 (Figs. 4 and 23) and is normally held in the path of the shoulder 166 by a tension spring 171. Another finger 172 (Figs. 1 and 24), affixed to the upper end of the rockshaft, projects into the path of a lug 173 carried by a rotary timing disk 174. Still another finger 175 affixed to the rockshaft 170 is arranged to close a normally open switch 176 in an electrical circuit 177 that includes the solenoid 36 (Figs. 5 and 24). The cutter 20 and the ledge 23 are thereby depressed below their operating level at the instant when the one-revolution clutch 163 retracts the trimmed shoe from the cutter.

Figure 2:
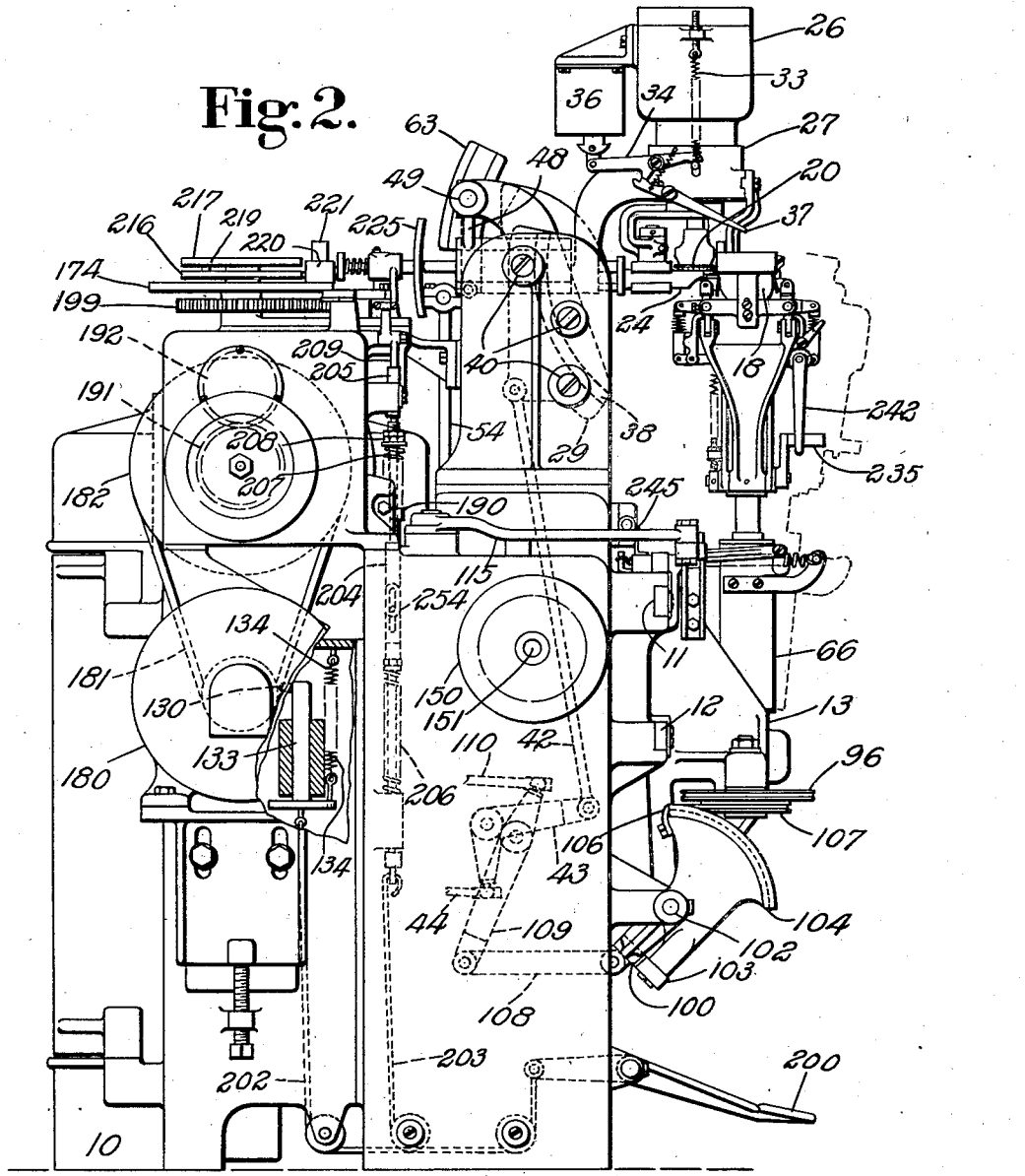
Fig. 2 is an elevation of the machine viewed from the left-hand side.

The power for operating the cam assemblage (Fig. 4) is derived from an electric motor 180 (Figs. 1, 2 and 3). Rotation is transmitted by belts 181 from a pulley on the motor shaft to a pulley 182 (Fig. 23) affixed to the driving member 183 of a friction clutch of the cone type. The driven member 184 is affixed to a shaft 185 on which the driving member may turn freely when disengaged from the driven member by a compression spring 186. A forked arm 187 affixed to a rockshaft 188 is arranged to shift the driving member against the driven member. An antifriction thrust bearing 189 is interposed between the forked arm and the driving member. Another arm 190 affixed to the rockshaft is arranged to be drawn down by a treadle 200 (Fig. 2) to start the machine.

Rotation of the driven member 184 (Fig. 23) is transmitted by a gear 191 to a gear 192 (Fig. 25) located above it and affixed to a shaft 193. A worm 194 carried by this shaft drives the worm wheel 159 (Fig. 4) and the gear trains hereinbefore described. A spur gear 195 formed on the hub of the worm wheel drives an internal gear 196 (Figs. 5 and 25) affixed to the lower end of a stem 197 on which a pinion 198 is formed. This pinion drives a gear 199 by which the timing disk 174 and two edge-gauge cams 216 and 217 are carried (see also Fig. 24).

The treadle 200 (Fig. 2), connected to the frame by a fulcrum pin 201, serves not only to start the machine but also to lock the pantograph. One flexible cable 202 connects the treadle and the vertically movable pin 133 which, when pulled down, releases the arm 130 and other elements by which the spring 131 locks the pantograph. Another flexible cable 203 connects the treadle and a vertically movable rod 204 that extends through a hole in the arm 190 (Fig. 23) and is provided with a latching block 205 (Fig. 1) at its upper end. This rod is normally held up by a compression spring 206 but it also extends through a compression spring 207 seated on the upper surface of the arm 190. The spring 207 is initially relaxed, but when the rod 204 is pulled down a nut 208 carried thereby compresses the spring enough to engage the clutch despite the opposition of the weaker spring 186. The treadle first pulls down the pin 133 far enough to release the lock of the pantograph before the clutch is engaged, and thereafter compresses the spring 207 enough to engage the clutch and place the upper end of the latching block 205 below a latching pawl 209. A tension spring 210 (Figs. 4 and 24) then moves the pawl to its latching position to maintain the engagement of the clutch until a cycle of the cams is completed.

The lug 173 (Fig. 24), after actuating the finger 172, trips the latching pawl 209 in consequence of actuating a finger 211, and thus permits the spring 186 to disengage the clutch. The tripping movement of the finger 211 is transmitted to the pawl by a link 212 (Figs. 1, 4 and 24).

If it is desired to trim a sole in such a way as to leave a marginal extension of uniform width the ledge 23 (Fig. 6) will suffice to guide the shoe according to the plan configuration of the marginal crease. The width of the extension may be regulated by adjusting the block 24 forward or back with respect to the holder 213 in which it is clamped by a screw 214. On the other hand, many shoe styles have marginal extensions wider at some points than at others. For example, the extension may be wider throughout the forepart than along the shank, or the outer margin of the forepart may be wider than the inner margin and the toe margin, as in the so-called Baltimore edge.

Figure 4:
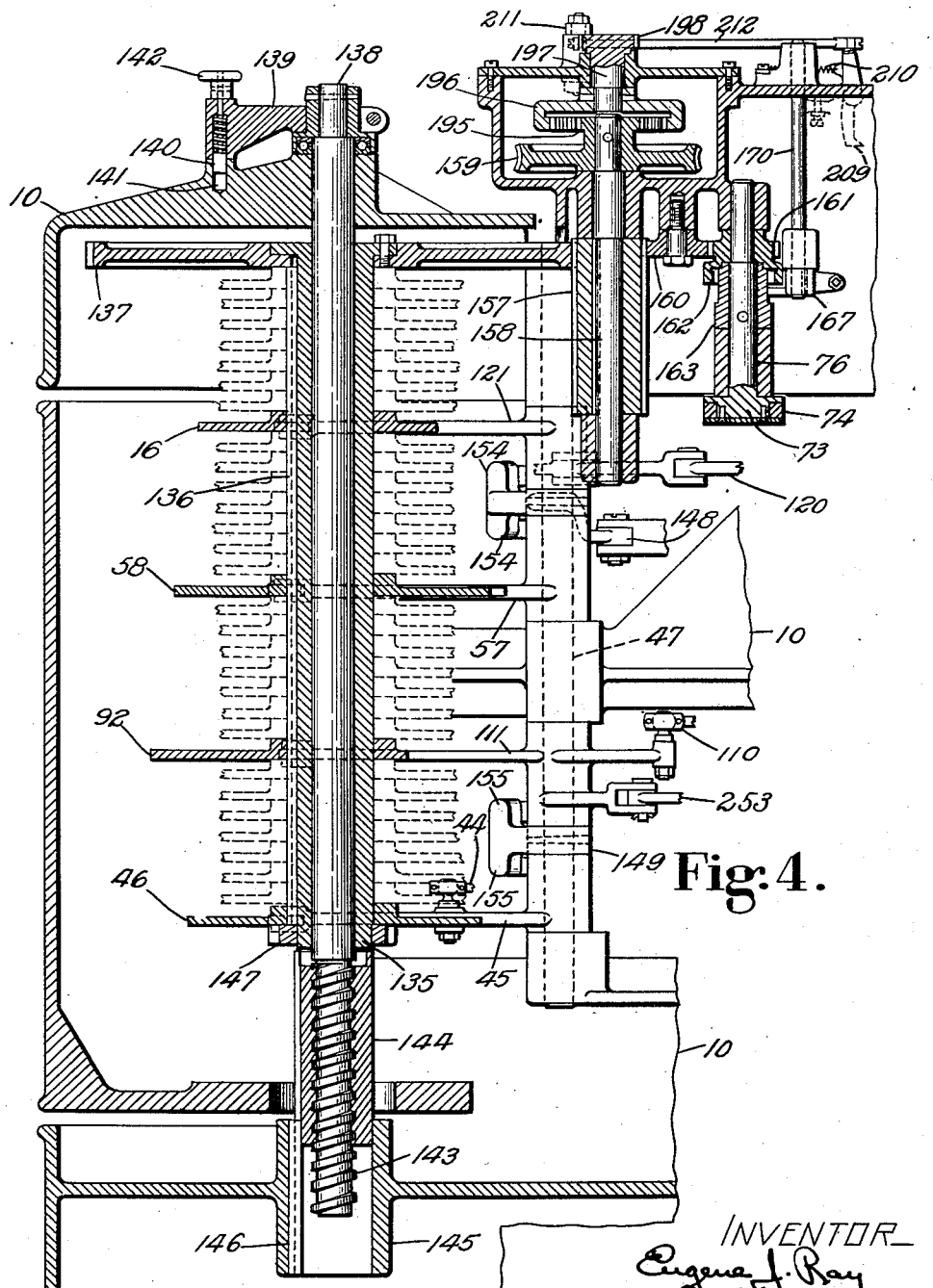
Fig. 4 is a flat development of a vertical section indicated by line IV—IV in Fig. 3, and includes the main cam assemblage and a train of gearing for displacing a shoe from the cutter at the conclusion of a trimming stage.

To provide for varying the width of an extension as the trimming operation progresses, the block 24 is provided with an automatic edge gauge 215 to be operated by a cam that rotates at the same angular velocity as the cam assemblage shown in Fig. 4 but about another axis. Two cams 216 and 217 for this purpose are represented in Fig. 5, one in dotted lines to indicate its location when superposed upon the other as it would be in practice. These cams are mates, one for a right shoe and the other for a left, and both may be detached and replaced by another pair designed for another style of shoe. They are stacked upon the driven unit comprising the timing disk 174 and the gear 199 which rotates about a fixed spindle 218 and is provided with an upstanding pin 219 for registering the cams with respect to the timing disk. Each cam has a hole to receive the spindle 218 and another hole to receive the registering pin.

A bell crank 220 (Figs. 5 and 8) is mounted on an upright fulcrum stud 221 to be operated by one cam or the other, as the case may be, the stud having sufficient length above its anchoring boss 222 to extend through the hub of the bell crank when the latter is supported at the level required by the upper cam 217, but in Fig. 5 the hub of the bell crank is seated directly on the boss 222 and thereby supported at the level required by the lower cam 216. When the upper cam is to be used a collar (not shown) will be interposed between the boss and the hub of the bell crank to support the latter at its upper operating level.

One arm of the bell crank is arranged to operate a plunger 223 (Fig. 8) against the thrust of a compression spring 224 that normally keeps the other arm against the cam in use. The plunger 223 has a bearing in an element of the frame with which it has a spline connection to prevent its turning. An arcuate plate 225 affixed to the plunger is arranged to abut the rear end of another plunger 226 that extends through the stem 28 of the support 27 and has bearings therein. The axis of this plunger coincides with axis A. The forward end of the plunger 226 is provided with a flat face 227 in a plane at right angles to axis A and arranged to abut the rear end of a stem 228 on which the edge gauge 215 is formed. This stem has a bearing in the block 24 and may slide lengthwise therein. The pressure of a shoe against the edge gauge is sufficient to keep the stem 228 against the face 227 and the plunger 226 against the plate 225. Since the block 24, the edge gauge 215 and the plunger 226 are all carried by the support 27, the relation of the edge gauge and the cutter is not affected by rocking the support about axis A nor by heightwise movements of the gauge and the cutter. Moreover, the incurved surface of the arcuate plate 225 constitutes a segment of a cylinder the axis of which coincides with axis B except when it is shifted slightly to the front or rear of the latter by an edge gauge cam. This surface preserves the relation of the edge gauge and the cutter despite angular movement of the trimming assemblage about axis B.

The edge gauge 215 is undercut to provide a flat vertical face 230 (Fig. 6) which need not be used for all shoes but which may be used to supplement the gauging lip 215, provided the shoe in process of being trimmed carries a trimming templet of the type set forth in United States Letters Patent No. 2,293,080, granted August 18, 1942, on my application. In these circumstances the surface 230 will be traversed by a straight portion of the templet extending along the shank of the shoe and the course of the trimming will then be governed by a gauge cam while the lip 215 remains out of contact with the templet.

Figure 27:
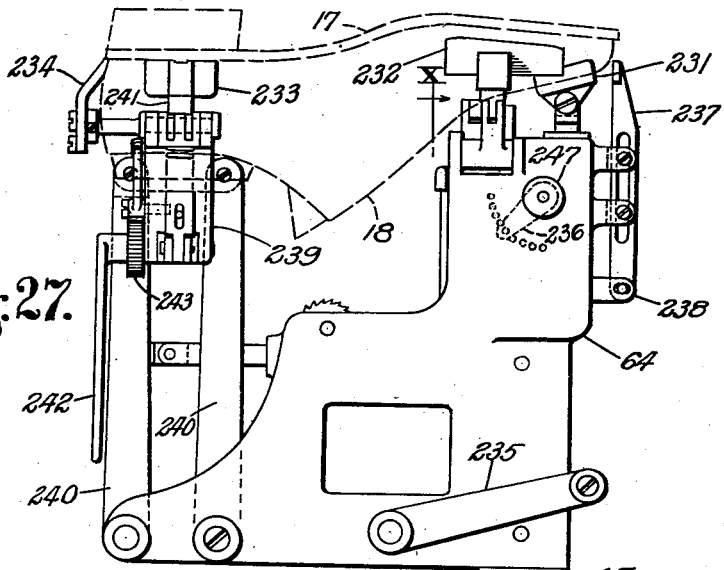
Fig. 27 is a side elevation of the jack.
Figure 28:
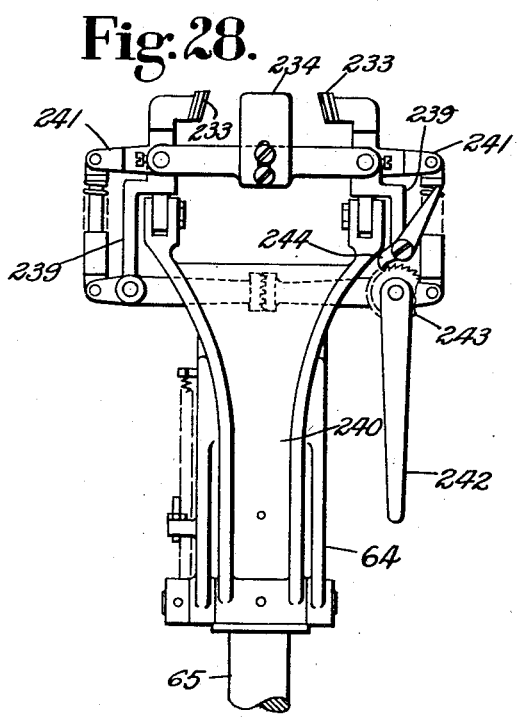
Fig. 28 is an elevation of the heel end of the jack.
Figure 29:
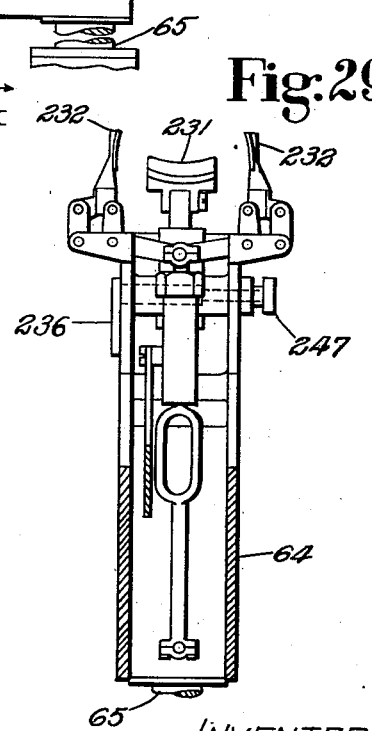
Fig. 29 is a vertical section indicated by line X—X in Fig. 27.

The jack, considered individually, constitutes the subject matter of my copending application for United States Letters Patent, Serial No. 488,484, filed May 26, 1943, in which its novel features and details of construction are shown and described at greater length than here. The head 64 of the jack is provided with a toe rest 231 (Fig. 27), two thin flexible plates 232 (Fig. 29) arranged to clamp the forepart of a shoe widthwise, two plates 233 (Fig. 28) arranged to clamp the counter portion widthwise, and a heel supporting member 234 arranged to abut the back of the counter portion in the rand crease. The forepart clamps 232 are curved lengthwise to insure contact of their ends with the body of a shoe, and they may be sprung slightly when their intermediate portions are pressed toward a shoe by applying clamping pressure. In this respect they have the characteristics of semi-elliptic leaf springs. A mechanism for closing and opening the forepart clamps includes an operating handle 235 and connections, some of which appear in Fig. 29. This mechanism is controlled by a ratchet and retaining pawl, not herein shown, to maintain clamping pressure.

The toe rest 231 may be adjusted up and down by turning a knob 247, and may be locked at various levels by an arm 236 that turns with the knob and carries a pin arranged to enter holes in the head 64. In practice, the toe rest will be set at a level that will insure a gap between the upper edges of the clamps 232 and the overhanging marginal extension of a sole. This gap should be deep enough to enable the clamps to run under the lip 215 (Fig. 6) without touching it, while the lip bears on the body of the shoe to control the course of trimming.

A toe gauge 237 is carried by the head 64 and arranged to be moved up and down by a lever 238 which receives motion from the handle 235. When the clamping plates 232 are retracted or open, the toe gauge is raised to be engaged by the toe of a shoe but not by the extension of the sole. Once a shoe has been located against this gauge the latter is carried down in consequence of depressing the handle 235 to close the clamping plates 232. The toe of the shoe is thus cleared for engagement by the lip 215 of the edge gauge.

The plates 233 and the heel supporting member 234 are all mounted on a pair of brackets 239 (Fig. 28) carried toward and from the toe rest by a pair of parallel links 240. The lower ends of these links are mounted on the head 64 and pivotally connected to it, while their upper ends are pivotally connected to the brackets. The plates 233 are affixed to bell cranks 241 and these are pivotally connected to the brackets. The brackets also carry interconnected means for operating the bell cranks to close the plates 233. The operating means includes a handle 242. A ratchet wheel 243 and a retaining pawl 244 are arranged to keep the plates in their clamping positions.

When setting up a shoe to make it ready for trimming it is preferable first to place its back against the abutment 234, the upper edge of which is formed to enter the rand crease and support the heel positively, then to close the plates 233 against the counter with moderate clamping pressure by operating the handle 242. These plates are also formed to enter the rand crease and engage the margin of the heel seat. While supporting the forepart in the right hand the operator may use the left hand to push the abutment 234 toward the toe rest until the shoe is arrested by the toe gauge 237. Once the toe rest is correctly adjusted heightwise and the toe lodged thereon, the forepart may be clamped by depressing the handle 235. This will also draw down the toe gauge. The position of the shoe now being fixed, additional clamping force may be applied to the counter clamps. The shoe will be on a last at this stage, but the last will have nothing to do with locating or securing it except to sustain the pressure of the clamping plates.

Figure 1A:
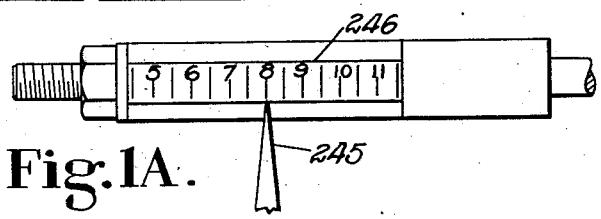

The next step of procedure is to give the feed-carriage a preliminary setting in accordance with the size of the shoe, and here it is to be observed that the toe ends of all shoes, regardless of their size, are located in the same relation to the jack by the toe gauge, and that their heel ends extend to the left more or less according to their size. To indicate this preliminary setting the carriage is provided with an index or pointer 245 (Fig. 1) arranged to cooperate with a scale of size marks (Fig. 1A) applied to a stationary member 246 affixed to the frame 10. A movement of the carriage to the right or left may be necessary to obtain the correct setting, but one result of obtaining it will be to locate the shank of the shoe lengthwise in the desired relation to the cutter 20 for the beginning of the trimming operation. Another result will be to adjust the pantograph for the corresponding size. This done, the operator may lock the pantograph by depressing the treadle 200 only far enough to pull down the pin 133 (Fig. 2) but not far enough to engage the main driving clutch (Fig. 23).

Now the machine is ready for presenting the shoe to the cutter which should be in rotation. When the handle 90 (Fig. 3) is moved to unlock the jack the shoe will be pulled toward the height gauge 25 by the spring 70 (Fig. 21) but may be retarded by hand. Unlocking the jack also lets off the clamping cam 82 and restores the floating effect of the jack-post spring 69 by which the sole of the shoe is normally held slightly above the level of the bottom of the height gauge. The operator may easily depress the shoe enough to place the margin of the sole under the height gauge and then trip the latch 37 (Fig. 2) to float the cutter. Finally, he will depress the treadle 200 far enough to engage the main driving clutch and let in the retaining latch 209 (Fig. 1) above the latching block 205.

The automatic cycle now begins. The cam assemblage (Fig. 4) operates the feed-carriage 13, turns the jack, and oscillates the trimming cutter about the movable axis A—A and the fixed axis B—B. Meanwhile, the jack-post will move up and down under the control of the height gauge 25 and the spring 69, and the jack will tilt about the axis C—C under the control of the spring 70 and whichever edge gauge is in use. At the conclusion of the trimming stage (Fig. 19) the coaction of the lug 173 and the finger 172 (Fig. 24) will start the retraction of the shoe from the cutter with tilting movement about the axis C—C and energize the solenoid 36 (Fig. 2) to depress the cutter and the other elements normally upheld by the springs 33. Before the shoe is disengaged from the height gauge the clamping cam 82 (Fig. 1) will restrain the jack from rising but will leave it free to turn.

While the shoe is being retracted the feed-carriage 13 will start its return travel under the power derived from the weight 14 (Fig. 3), but this travel will be retarded in some degree by a hydraulic snubber 250 the cylinder of which is anchored to the frame 10 and the piston of which is connected to the lever 121 by a link 251. Meanwhile, the jack will be turned reversely to its initial position by the power derived from the weight 91 (Fig. 16) and this turning will be retarded in some degree by a hydraulic snubber 252 the cylinder of which is anchored to the frame and the piston of which is connected to the lever 111 by a link 253.

While the carriage and the jack are returning to their initial positions the timing lug 173 (Fig. 24) advances to the trip finger 211 of the stop mechanism and finally operates the latter to disengage the latch 209 (Fig. 1) from the block 205. The main driving clutch (Fig. 23) is thereby left free to be disengaged by the spring 186. As shown in Fig. 2, the vertical rod 204 comprises an upper section and a lower section having a pin-and-slot connection 254 which provides a limited relative lengthwise movement of the sections. This connection not only enables the spring 206 to return the treadle 200 to its initial position while the upper section of the rod remains caught by the latch 209, but it also relieves the pin 133 from the load of the treadle. This pin must be held up by its spring 134 to unlock the pantograph during the final stage of return travel of the feed-carriage 13.

Having described my invention, what I claim as new and desire to secure by Letters Patent of the United States is:

1. In a machine of the type in which a power-operated instrumentality is arranged to perform a progressive operation on a shoe bottom, a jack for supporting the shoe in operative relation to said instrumentality, a carriage on which the jack is mounted, power-operated mechanism for imparting feeding motion to the carriage, power-operated mechanism for turning the jack with respect to the carriage, power-operated means for rocking the operating instrumentality about two axes lying one across the other, and means by which one of said axes is fixed.

2. A machine according to the terms of claim 1 in which the fixed axis is parallel with the path of work-feed at the point where the operating instrumentality performs its operation on the shoe bottom.

3. In a machine of the type in which a power-operated instrumentality is arranged to perform an operation on a shoe bottom while the shoe is fed and turned end for end to render the operation progressive, a jack for supporting the shoe, a carriage on which the jack is mounted, power-operated mechanism for imparting feeding motion to the carriage, power-operated mechanism for turning the jack, power-operated mechanism for rocking the operating instrumentality about a fixed axis according to transverse curvatures of the shoe bottom, and power-operated mechanism for rocking the same instrumentality about another axis according to lengthwise curvatures of the shoe bottom.

4. In a machine of the type in which a power-operated instrumentality is arranged to perform an operation on a shoe bottom while the shoe is fed and turned to render the operation progressive, a jack for supporting the shoe, a carriage on which the jack is mounted, means for constraining the carriage to rectilinear travel, power-operated mechanism for imparting feed motion to the carriage, power-operated mechanism for turning the jack with respect to the carriage, a work-guide arranged to be engaged by the perimeter of the body of the shoe, and means by which the jack is constrained to maintain the shoe against said guide.

5. In a machine of the type in which a power-operated instrumentality is arranged to perform an operation on a shoe bottom while the shoe is fed and turned to render the operation progressive, a jack for supporting the shoe, a carriage on which the jack is mounted, means for constraining the carriage to a straight path of travel, power-operated mechanism for imparting feed motion to the carriage, a straight bar parallel with said path, power-operated mechanism for shifting said bar to and fro laterally according to plan curvatures of a shoe, and means mounted on said carriage and operable by said bar for turning the jack.

6. In a machine of the type in which a power-operated instrumentality is arranged to perform an operation on a shoe bottom while the shoe is fed and turned to render the operation progressive, a feed-carriage, means for guiding the carriage in a straight line, a bearing sleeve mounted on the carriage, a jack arranged to turn in the sleeve about an axis transverse to said line, a straight bar parallel with said line, power-operated mechanism for shifting said bar to and fro laterally according to plan curvatures of a shoe, means operable by said bar for turning the jack, and power-operated means for feeding the carriage in timed relation to the turning of the jack.

7. A shoe machine comprising a feed-carriage, a frame provided with means for guiding the feed-carriage in a straight horizontal path, power-operated means for moving the feed-carriage along said path, shoe-supporting means mounted on the feed-carriage and arranged to turn about an upright axis, power-operated means including an instrumentality arranged to operate progressively on a shoe, and power-operated mechanism including a member mounted on the frame and a member mounted on the feed-carriage for turning the shoe-supporting means, one of said members having a surface abutting the other and extended lengthwise of said path to maintain the abutting relation throughout the range of the feed-carriage.

8. A shoe machine comprising a feed-carriage, a frame provided with means for guiding the feed-carriage in a straight horizontal path, power-operated means for moving the feed-carriage along said path, shoe-supporting means mounted on the feed-carriage and arranged to turn about an upright axis, power-operated means including an instrumentality arranged to operate progressively on a shoe, and power-operated mechanism including a lever mounted on the frame and a lever mounted on the feed-carriage for turning the shoe-supporting means, said levers being constrained to oscillate about a common axis parallel with the path of the feed-carriage and one of them having an operating surface engaging the other and extended lengthwise of said path to maintain such engagement throughout the range of the feed-carriage.

9. A shoe machine comprising a frame having a straight horizontal track, a feed-carriage constrained to travel along the track, power-operated means for moving the feed-carriage, a shoe-jack carried by the feed-carriage and arranged to turn about an upright axis, power-operated means including a lever mounted on the frame and constrained to oscillate about an axis parallel with the track, yieldable means mounted on the feed-carriage for turning the shoe-jack in one direction, and means mounted on the feed-carriage but operable by said lever for turning the shoe-jack in the opposite direction.

10. In a machine having means for performing a progressive operation on the bottom of a shoe, work-supporting means comprising a straight track, a carriage mounted thereon, a bearing member mounted on the carriage and constrained to tilt about an axis parallel with said track, and a jack carried by said bearing member and constrained thereby to turn about a movable axis transverse to the path of the carriage and to move lengthwise of said movable axis.

11. In a machine for operating on shoes, shoe-supporting means comprising a bearing member, a jack-post arranged therein and constrained thereby to turning movement about its axis and movement lengthwise of said axis, shoe-clamping means carried by the jack-post and arranged to maintain the center of the toe of a shoe approximately in coincidence with said axis, and pivotal means by which said bearing member is supported, the pivotal axis of said pivotal means being transverse to the axis first specified.

12. A shoe machine comprising a feed-carriage, a frame provided with means for guiding the feed-carriage in a straight path, power-operated mechanism for moving the carriage along said path, a bearing sleeve mounted on the carriage and constrained to rock about an axis parallel with said path, a jack arranged to turn in the sleeve about an axis transverse to said path, a power-operated instrumentality arranged to operate on a shoe carried by the jack, a work-guide arranged to be engaged by the perimeter of the body of the shoe, resilient means by which the sleeve is stressed in one direction about the first said axis to maintain the shoe against the work-guide, and power-operated mechanism for turning the jack about the other said axis in timed relation to the travel of the feed-carriage.

13. A shoe machine comprising a feed-carriage, a frame provided with means for guiding the feed-carriage, power-operated mechanism for moving the carriage, a bearing sleeve mounted on the carriage, a jack movable up and down in the sleeve, a tread-guide arranged to overlie and engage the tread surface of an inverted shoe carried by the jack, resilient means by which the jack is normally upheld to maintain the shoe against the tread-guide, a power-driven instrumentality arranged to operate on the shoe bottom, power-operated mechanism for turning the jack, and power-operated mechanism arranged to lock the jack and shift the sleeve to displace the shoe from engagement with the tread-guide.

14. A shoe machine comprising a power-operated edge-trimming cutter, supporting means therefor arranged to rock about a fixed axis, a straight track parallel with said axis, a feed-carriage guided by the track, a bearing sleeve munted on said carriage and constrained to rock about another axis parallel with the first said axis, a jack arranged to turn in said sleeve and support a shoe, yieldable means by which the sleeve is stressed to maintain the sole of the shoe against the trimming cutter, power-operated mechanism for imparting feeding movement to the carriage, power-operated mechanism for turning the jack, a trimming guide adjacent to the cutter for engaging the body of the shoe, and power-operated means for shifting the trimming guide.

15. A shoe machine comprising a power-driven shaft provided with an edge-trimming cutter, a bearing unit in which the shaft is journaled, a support on which the bearing unit is mounted and constrained to rock about an axis, means by which said support is constrained to rock about another axis, two power-operated mechanisms for rocking the bearing unit and said support respectively about said axes, yieldable means arranged to support a shoe against the trimming cutter, two power-operated means arranged respectively to feed and turn the shoe-supporting means, a trimming guide carried by said bearing unit and arranged to abut the body of the shoe adjacent to the upper-crease, and power-operated mechanism for shifting the trimming guide with respect to the bearing unit to regulate the width of the trimmed marginal extension.

16. A shoe machine comprising a jack for holding a shoe upside down, power-operated means by which feeding and turning movements are imparted to the jack, a rotary power-driven assemblage having an upright axis of rotation and including a tool the perimeter of which is arranged to operate on the perimeter of the shoe-sole, yieldable means by which said rotary assemblage is floated to counteract its force of gravity, and a ledge also floated by said yieldable means to move up and down with said rotary assemblage, said ledge being arranged to engage the marginal extension of the shoe adjacent to said tool and thereby maintain a constant heightwise relation of the tool and the marginal extension.

17. A shoe machine comprising a jack for holding a shoe upside down, means for imparting feeding and turning movements to the jack, a rotary power-driven unit having an upright axis of rotation and including a tool the perimeter of which is arranged to operate on the perimeter of a shoe sole, a bearing unit in which the rotary unit is journaled, power-operated means for rocking the bearing unit about two axes transverse to each other, a trimming guide carried by the bearing unit and arranged to rock therewith, and power-operated means arranged to shift the trimming guide with respect to the bearing unit in timed relation to the feeding and turning movements of the jack.

18. A shoe machine comprising a power-operated instrumentality for operating on a shoe, movable means by which said instrumentality is constrained to rock about intersecting axes of which the point of intersection is fixed in location, a feed-carriage, shoe-holding means carried by the carriage but movable relatively thereto, power-operated mechanism for imparting feeding movement to the carriage, power-operated mechanism for turning the shoe-holding means with respect to the carriage, and power-operated means for rocking the operating instrumentality about said fixed point with components of angular movement about each of said axes.

19. An edge-trimming machine comprising an upright cutter-shaft, an edge-trimming cutter carried thereby, a bearing member in which the cutter-shaft is journaled, yieldable means by which the cutter-shaft is floated, means for supporting a shoe in cooperative relation to the trimming cutter, power-operated means for feeding and turning the shoe-supporting means, and power-operated means arranged to depress the cutter-shaft at a predetermined point in the cycle of the feeding and turning means.

20. An edge-trimming machine comprising an upright cutter-shaft, an edge-trimming cutter carried thereby, a bearing member in which the cutter-shaft is journaled, means for supporting a shoe in cooperative relation to the trimming cutter, a ledge affixed to the bearing member and arranged to underlie and engage the marginal extension of a shoe, yieldable means by which the bearing member is floated to uphold the ledge and the cutter-shaft, power-operated means for feeding and turning the shoe-supporting means, and power-operated means arranged to depress the bearing member at a predetermined point in the cycle of the feeding and turning means.

21. A shoe machine comprising a support constrained to rock about a fixed axis, a bearing member mounted thereon and arranged to rock about an individual axis, a power-operated shoe-working instrumentality carried by said bearing member, a straight track, a carriage guided by the track, shoe-supporting means mounted on the carriage and arranged to present a shoe to said instrumentality and turn it end for end, and a plurality of power-operated and cooperatively timed mechanisms, one for moving the carriage along said track, one for turning the shoe-supporting means with respect to the carriage, one for rocking the support about said fixed axis and one for rocking said bearing member about said individual axis.

22. A shoe machine comprising a tool arranged to rotate about an axis to operate on the perimeter of the outsole of a shoe, means for driving said tool, means for carrying and turning a shoe to traverse the perimeter of said tool with the perimeter of the outsole, power-operated means arranged to impart feeding and turning movements to said carrying means, and power-operated means arranged to rock said tool about a fixed axis transverse to the rotational axis of the tool.

23. A shoe machine comprising a tool arranged to rotate about an axis to operate on the perimeter of the outsole of a shoe, means for driving said tool, means for carrying and turning a shoe to traverse the perimeter of said tool with the perimeter of the outsole, power-operated means arranged to impart feeding and turning movements to said carrying means, two power-operated means arranged to rock said tool about two individual axes transverse to each other and both transverse to the rotational axis of the tool, and means constraining said two power-operated means to maintain a point on the perimeter of said tool at a fixed locality.

24. A shoe machine comprising a tool arranged to rotate about an upright axis to operate on the perimeter of the outsole of a shoe, means for driving said tool, means for carrying and turning a shoe to traverse the perimeter of said tool with the perimeter of the outsole, power-operated means arranged to impart feeding and turning movements to said carrying means, power-operated means arranged to rock said tool about an axis that intersects said upright axis and a point at which the work leaves contact with the tool, and power-operated means arranged to rock the tool also about an axis transverse to both axes aforesaid.

25. A shoe machine comprising a tool arranged to rotate about an axis to operate on the perimeter of the outsole of a shoe, means for driving said tool, means for carrying and turning a shoe to traverse the perimeter of said tool with the perimeter of the outsole, power-operated means arranged to impart feeding and turning movements to said carrying means, and two synchronized power-operated means arranged to rock said tool about two axes perpendicular to each other and having a fixed point of intersection that coincides with a point of tangency between said tool and the outsole.

26. An edge-trimming machine comprising a power-driven trimming cutter arranged to rotate about an upright axis, shoe-supporting means arranged to turn about an upright axis and maintain a shoe upside down, a tread-guide supported adjacent to the trimming cutter, said shoe-supporting means including yieldable means for upholding the sole of the shoe against the tread-guide, power-operated means for feeding the shoe-supporting means, power-operated means for turning the shoe-supporting means, and yieldable means by which the shoe-supporting means is constrained to maintain the perimeter of the sole against the perimeter of the cutter as the shoe is fed and turned.

27. A shoe machine comprising a shoe-carrier including means for holding a shoe upside down, power-operated means by which feeding and turning motions are imparted to said carrier, power-operated means including an edge-trimming cutter arranged to rotate about an upright axis, yieldable means by which said cutter is upheld with provision for downward movement thereof, a ledge movable up and down with said cutter and arranged to run on the marginal extension of the shoe to maintain a constant heightwise relation of the cutter and said extension, and power-operated means arranged to rock said cutter about a point that coincides with its profile at a point of contact with the work.

28. A shoe machine comprising a shoe-carrier including means for holding a shoe upside down, power-operated means including an instrumentality arranged to perform a progressive operation on the shoe-bottom, means by which said shoe-carrier is supported with provisions for tilting movement about a fixed horizontal axis, feeding movement lengthwise of said axis and turning movement about an upright axis, power-operated means by which feeding movement along said fixed axis is imparted to said shoe-carrier, and power-operated means by which turning movement is imparted to said shoe-carrier.

29. A shoe machine comprising a shoe-carrier including means for holding a shoe upside down, power-operated means including an instrumentality arranged to perform a progressive operation on the shoe-bottom, means by which said shoe-carrier is supported and constrained to tilt about a fixed horizontal axis, to travel lengthwise of said fixed axis, to turn about an upright axis at right angles to said fixed axis, and to move lengthwise of said upright axis, power-operated means by which said carrier is moved along said fixed axis, and power-operated means by which the carrier is turned about said upright axis.

30. A shoe machine comprising a power-driven instrumentality for performing an operation on a shoe bottom, a shoe-supporting jack, starting and stopping mechanism, means driven by said mechanism for feeding and turning the jack, spring-actuated means arranged to impart stopping movement to said mechanism, a latch arranged to restrain said mechanism in driving position, means driven by said mechanism for moving the jack to retract the shoe sidewise from said instrumentality at the conclusion of the feeding movement, and means driven by said mechanism for tripping said latch after such retraction of the shoe.

31. A shoe machine comprising a power-driven instrumentality for operating on a shoe bottom, a shoe-supporting jack, starting and stopping mechanism, means driven by said mechanism for feeding the jack, said feeding means including a pantograph for regulating the extent of the feeding movement, spring-stressed means arranged normally to lock the pantograph in any one of a plurality of positions of adjustment, means driven by said mechanism for turning the jack, a counterweight arranged to impart reverse feeding movement to said feeding means at the conclusion of the feeding movement, and means operable by reverse feeding movement of said feeding means for retracting said locking means to unlock the pantograph.

32. A shoe machine comprising a rotary power-driven tool, a stationary frame, movable means mounted on said frame for supporting said tool, the frame and said means having cooperative portions by which a point on the perimeter of the tool is maintained at a fixed locality and by which the supporting means is constrained to rock about a fixed axis intersecting that locality, power-operated means arranged to rock said supporting means about said fixed axis, a shoe-carrier arranged to maintain a shoe against said tool, and power-operated means by which feeding and turning motions are imparted to said shoe-carrier.

33. A shoe machine comprising a stationary frame, a rotary power-driven tool, a rocker mounted on said frame and constrained thereby to rock about a fixed axis, a supporting member mounted on said rocker and constrained thereby to rock about another axis having a fixed point of intersection with said fixed axis, said tool being mounted on said supporting member and constrained thereby to maintain a point on its perimeter in tangential relation to said fixed axis at said point of intersection, two power-operated means arranged one to rock said rocker about said fixed axis and the other to rock said supporting member about said other axis, and power-operated means arranged to feed and turn a shoe in contact with the perimeter of said tool.

34. A shoe machine comprising a straight track, a feed-carriage guided thereby, a bearing member, means pivotally connecting the bearing member and the carriage, the pivotal axis of said means being parallel with said track, a jack journaled in said bearing member to turn about an individual axis transverse to said track, individual power-operated mechanisms one for moving the carriage along said track and the other for turning the jack about said individual axis, a support constrained to rock about a fixed axis parallel with said track, a power-driven tool carried by said support and arranged to perform a progressive operation on the margin of a shoe carried by said jack, and power-operated means arranged to rock said support as the operation progresses, said fixed axis intersecting the operating locality of said tool.

EUGENE J. RAY.